United States Patent [19]

Pequet et al.

[11] Patent Number: 4,719,364
[45] Date of Patent: Jan. 12, 1988

[54] MULTIPLE TIME DELAY POWER CONTROLLER APPARATUS

[75] Inventors: John D. Pequet, Laguna Niguel; Michael B. Pulizzi, Anaheim; Roger Cook, Garden Grove, of Calif.

[73] Assignee: Pulizzi Engineering, Inc., Santa Ana, Calif.

[21] Appl. No.: 782,307

[22] Filed: Oct. 1, 1985

[51] Int. Cl.⁴ .............................................. H02J 7/00
[52] U.S. Cl. .............................. 307/141; 307/132 E; 307/112; 307/141.4
[58] Field of Search .................. 307/38, 41, 112, 113, 307/115, 132 E, 137, 139, 141, 141.4, 594–600; 361/1, 3, 22, 28, 33, 73, 83, 94, 97, 99, 139, 160, 195, 196; 364/146; 340/309.4, 309.15

[56] References Cited

U.S. PATENT DOCUMENTS

| | | | |
|---|---|---|---|
| 3,050,713 | 8/1962 | Harmon | 307/596 X |
| 3,178,591 | 4/1965 | Werme | 307/596 X |
| 3,229,164 | 1/1966 | McCartney et al. | 307/132 E X |
| 3,258,613 | 6/1966 | Felcheck et al. | 307/596 X |
| 3,560,769 | 2/1971 | Shimizu | 307/596 |
| 3,628,068 | 12/1971 | Long | 307/596 |
| 3,639,844 | 2/1972 | Karklys | 307/596 X |
| 3,700,914 | 10/1972 | Granieri et al. | 307/141 |
| 3,801,872 | 4/1974 | Zocholl et al. | 361/73 |
| 3,826,955 | 7/1974 | Fest | 307/598 X |
| 4,011,517 | 3/1977 | Pommerening et al. | 307/590 X |
| 4,016,474 | 4/1977 | Mason | 307/41 X |
| 4,177,388 | 12/1979 | Lingenfelter | 307/38 |
| 4,215,277 | 7/1980 | Werner et al. | 307/132 R X |
| 4,227,062 | 10/1980 | Payne et al. | 307/41 X |
| 4,234,801 | 11/1980 | Small | 307/115 X |
| 4,270,573 | 6/1981 | Sturman et al. | 307/38 X |
| 4,400,699 | 8/1983 | Glasmacher | 307/141 X |
| 4,419,590 | 12/1983 | Voss | 307/41 |

Primary Examiner—William M. Shoop, Jr.
Assistant Examiner—Shik Luen Paul Ip
Attorney, Agent, or Firm—Howard R. Lambert

[57] ABSTRACT

Multi-time delay power controller apparatus for providing time-delayed power or control signals to associated electrical equipment, such as computers and disc drives, comprises a power stage configured for connecting to a conventional power outlet, a D.C. power supply connected to an interval D.C. voltage bus, an output stage having a plurality of time delayed outputs and a plurality of time delay timing stages connected in electrical series to one another between the D.C. voltage bus and ground. Each such timing stage includes a timing means, and a normally open control relay. Coils of odd numbered timing stages are connected to ground and of even numbered stages to the D.C. voltage bus. The timing stages are connected so that the timing out of one stage starts the timing of the next-in-sequence stage, timing of the first-in-sequence timing stage being started when the apparatus is turned on. The control relays are actuated when a stage times out, thereby causing a time delayed control signal to be provided to the output stages. When time delayed power outputs are provided, the time delayed control signal energizes a normally open power relay which connects the associated power output to the power stage.

12 Claims, 10 Drawing Figures

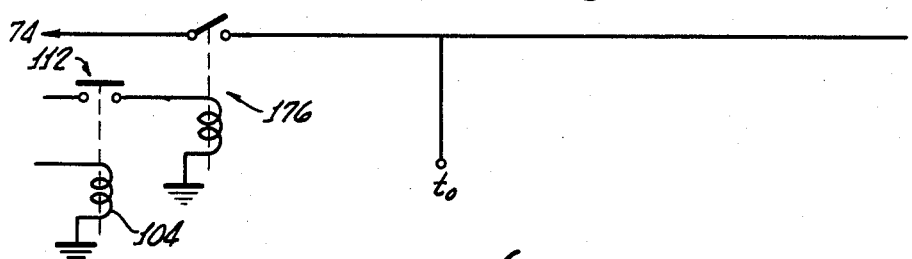
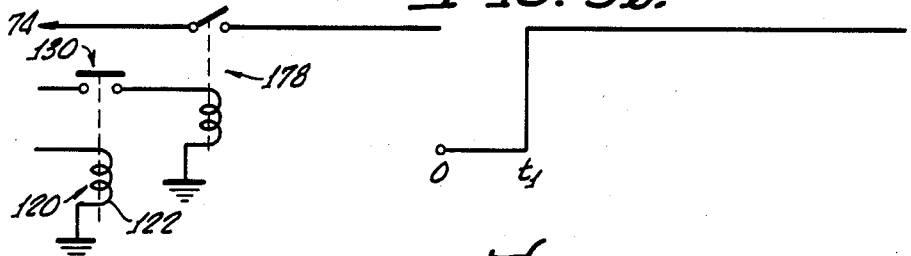
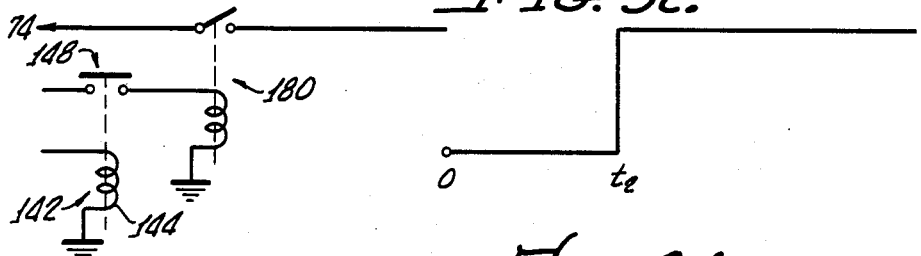
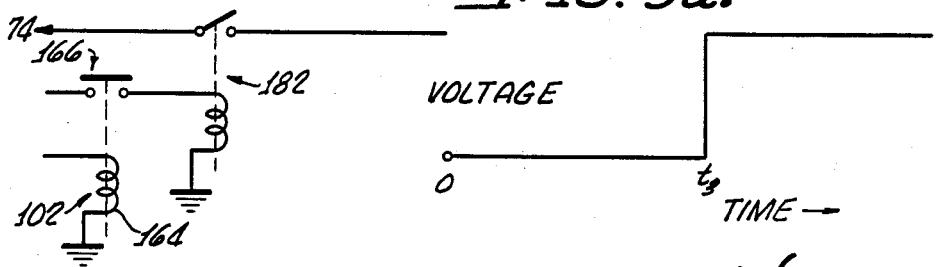
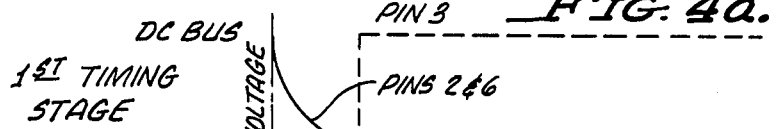
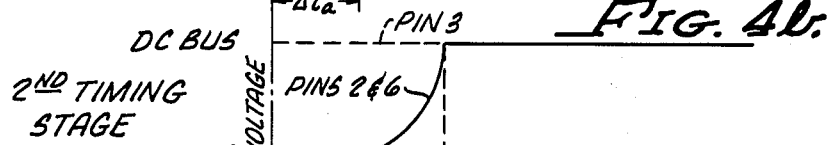
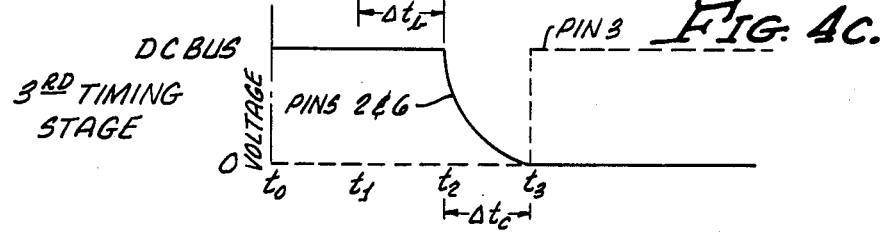

MULTIPLE TIME DELAY POWER CONTROLLER APPARATUS

BACKGROUND OF THE INVENTION

1. Field of the Invention

The present invention relates generally to the field of power controller apparatus for electrical and electronic equipment, and more particularly to time delay power controller apparatus for such equipment.

2. Discussion of the Prior Art

It is well known by electrical engineers and most users of electrical of electronic equipment that when a piece of such equipment is turned on, a high turn-on electric current is caused in the equipment. Within several seconds, usually less than about 2–4 seconds, the turn-on current spike decays to a steady state, operating current. The turn-on current spike is caused by the charging of cooperative elements or portions of the equipment and is dependent upon the rate of electrical charging of the equipment, as given by the differential equation:

$$I=dQ/dt,$$

wherein I is the current and dQ/dt is the time rate of charging.

From the above equation it can be seen that a fast equipment turn-on, in which dQ/dt is high, gives rise to a high current spike. Typically, the turn-on current spike is several times higher than the steady state or average current drawn by the equipment subsequent to turn-on.

The combined effect of individual high turn-on currents of each of several or a number of pieces of electrical or electronic equipment is that the current carrying capacity of existing building electrical circuits into which the equipment is connected may be exceeded. This then causes circuit breakers to trip open at the instant the equipment is turned on, thereby shutting down all the equipment. This may occur even though the building circuit may have capability for safely handling the combined steady state operating currents of the equipment.

In some instances where several different building electrical circuits are conveniently available, the possibility of overloading individual ones of the building circuits may be avoided by connecting different pieces of equipment into separate circuits. However, a multiplicity of separate building circuits is typically not available in a single room where a number of pieces of electrical or electronic equipment, for example, a computer and several associated disc drives, are located. The installation of several independent building circuits to service several pieces of electrical equipment may be very costly.

Although sometimes possible to do so, it is generally not feasible to substantially reduce turn-on current spikes by increasing the equipment turn-on time. For example, a slow rate of applying voltage might be damaging to many types of electrical equipment and motors.

As a consequence of high turn-on current problems associated with the simultaneous turning on of several pieces of electrical equipment, it is usually preferable to turn on just one piece of equipment at a time, with the interval between the turning on of successive pieces of equipment being sufficient to assure that the current drawn by one piece of equipment has dropped from its high turn-on level to its normal operating level before the next piece of equipment is turned on. The following of such a time delay turn-on procedure generally permits several pieces of electrical equipment to be operated from a single building circuit without overloading the circuit.

However, the manual turn-on sequencing of several pieces of equipment is, itself, generally unsatisfactory. This is because the required time interval between the successive turn-ons is difficult to manually control. Also it may be necessary or desirable to always follow the same, predetermined turn-on sequence for a particular system of interacting electrical equipment. The following of a predetermined specific turn-on sequence may be difficult to assure by manual turn-on procedures, and out-of-sequence equipment turn-ons may cause system malfunctions, for example, loss of data in a computer system.

Because of such high current turn-on problems, specialized power controller equipment has been developed which typically provide both an instantaneous power output and a single time delayed power output or time delayed output signal. If, however, multiple time delays are required, as is the case with computer systems having a main frame computer and two or more data storage disc drives, it has been necessary to cascade two or more of the available power controllers in such a manner that one power controller provides a time delayed signal to another power controller to start its operation, and so on.

Several disadvantages are, however, associated with the use of such cascaded power controllers. For example, the use of several independent power controllers is expensive and the several power controllers require the use of often limited rack space. Also there is the problem of maintaining the several power controllers in the proper operating relationship relative to one another; particularly if any of the power controllers are temporarily disconnected for servicing. Still further, an excessive amount of equipment interwiring is required which may, in and of itself, result in electrical malfunctions or reduced operational reliability. Still further, each of the power controllers requires its own power source and the building wiring may not provide sufficient electrical outlets to accommodate the various power controllers.

To the knowledge of the present inventors, a multi-time delayed power controller has not, heretofore, been available. One reason for such availability is believed to be the difficulty in providing multiple internal delays to power outlets in a single, economical power controller.

For these and other reasons, a need exists for time delay power controllers with two or more internal delays and which provide two or more delayed power outputs capable of powering other electrical equipment.

SUMMARY OF THE INVENTION

Time delay power controller apparatus, in accordance with the present invention, comprises a power stage and means adapted for connecting the power stage to a conventional power source, a plurality of time delayed outputs, a D.C. voltage bus and a ground, a D.C. power supply connected to the D.C. bus, and a plurality of time delay timing stages connected between the D.C. bus and ground.

Each of the timing stages includes, a timer initiating voltage input line connected to the timer, a time delay voltage output line and a control relay connected to a corresponding one of the time delayed outputs and having an energizing coil connected to the time delay voltage output line. Further included in each of the timing stages are timing means connected between the timer initiating voltage input line and the time delay voltage output line, for causing, a predetermined time interval after a change in voltage stage appears on the timer initiating voltage input line, a voltage state change on the time delay voltage output line. The voltage state change on the time delay voltage output line causes the energizing of the associated control relay coil and thereby causes a time delayed control signal to be provided by the control relay to the corresponding one of the time delayed outputs. Means are provided for interconnecting the time delay timing stages in electrical series with one another, with the time delay voltage output line of each timing stage, except the last-in-sequence one, being connected to the timer initiating voltage input line of the next-in-sequence one of the timing stages.

Means are additionally provided for changing the voltage state on the timer initiating voltage input line of the first-in-sequence one of the timing stages so as to start time delaying operation of the apparatus and increasing-in-time delay control signals to be applied to successive ones of the time delayed outputs.

The time delayed outputs may comprise time delayed power outputs adapted for providing electrical power to electrical equipment connected thereto, and including means responsive to the time delayed control signal received from a corresponding one of the timing stage control relays for connecting the power output to the power stages so that electrical power is applied, in a time delayed sequence, to the time delayed power outputs. In an embodiment, each of the time delayed power outputs include a normally open power relay electrically connected between the power output and the power stage, the relays being closed by the time delayed control signal from a corresponding one of the timing stage control relays so as to connect the power output to the power stage.

It is preferred that each of the control relays is a normally open relay and that one side of the control relay coil of every other one of the timing stages is connected to the D.C. bus and one side of the control relay coil of intermediate ones of the timing stages is connected to ground. Also preferably, there are at least two time delayed timing stages.

In one embodiment of the invention, means are included for turning on the apparatus, there being a non-time delay power output connected for receiving power from the power stage when the apparatus is turned on. Also, the means for changing the voltage state on the timer initiating voltage input line of the first-in-sequence one of the timing stages also changes the voltage state in response to the apparatus being turned on.

Advantageously, the apparatus may include a first, non-time delay power output and means for applying power from the power stage to the first power output. The time delay outputs may comprise second and third, time delay power outputs, each of which include means responsive to the time delay control signal provided thereto by the corresponding one of the timing stage relays for connecting the second and third power outlets to the power stage. The means for changing the voltage stage on the timer initiating voltage input line of the first-in-sequence timing stage is responsive to the means for applying power to the first power output for simultaneously providing the voltage state change to the first-in-sequence one of the timing stages. In an embodiment, the power stage is connected to a conventional, 208 volt, 3 phase power source and provides power from different ones of the 3 phases to different ones of the first, second and third power outputs.

Preferably, the time delay intervals provided by the timing stages are substantially equal to one another, such time delays being preferably between about 2 to about 6 seconds and more preferably about 4 seconds.

BRIEF DESCRIPTION OF THE DRAWINGS

A better understanding of the present invention may be had from a consideration of the following detailed description, taken in conjunction with the accompanying drawings in which:

FIG. 3 is a timing diagram showing voltages at points of the time delay timing stages and showing typical current requirements of exemplary electrical equipment connected to time delay power outputs of the time delay power controller apparatus, FIG. 3a showing voltages in the first timing stage, FIG. 3b showing voltages in a second timing stage and FIG. 3c showing voltages in a third timing stage.

FIG. 4 is a diagram showing output power relay portions of the apparatus and showing time delayed power outputs provided thereby, FIG. 4a relating to a "Master (non-time delay) power output, FIG. 4b relating to a "Delay" power output, FIG. 4c relating to a "Delay 2" power output and FIG. 4d relating a "Delay 3" power output.

DESCRIPTION OF THE PREFERRED EMBODIMENT

Figure 1:
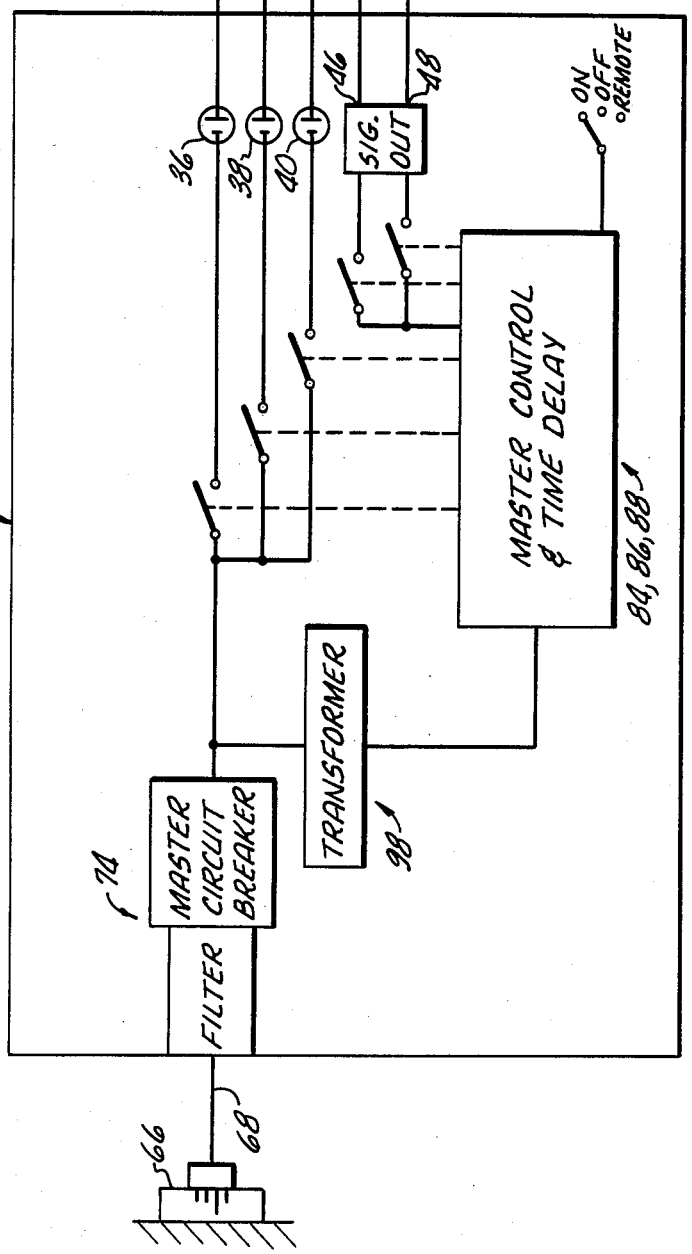
FIG. 1 is a generalized, functional block diagram showing the time delay power controller apparatus of the present invention to which are shown operatively connected, by way of illustration, a plurality of power equipment controlled by the apparatus.

There is shown, in block diagram form, in FIG. 1 an examplary electronic or electrical system 10, in which a multiple time delay power controller apparatus 12, according to the present invention, may be used to advantage. As more particularly described below, apparatus 12 is configured, and is operative, for controlling other pieces of electrical or electronic equipment (E.C.) such as those E.C.'s designated, by way of illustrative example, in FIG. 1 by the reference numbers 14, 16, 18, 20 and 22, E.C.'s 20 and 22 being shown in phantom lines for reasons to become apparent.

In general, the function of apparatus 12 is to provide timed delayed outputs to E.C.'s such as E.C.'s 14–22 (FIG. 1). In addition, one or more non-time delayed outputs may, for convenience or other purposes, be provided by apparatus 12. The time delayed outputs (as well as some or all of the non-time delayed outputs) may be of the power-type or of the signal-type.

However, for illustrative purposes, apparatus 12 is shown in FIG. 1 as having both power-type and signal type outputs. Accordingly, E.C.'s 14, 16 and 18 are shown to be directly powered, through respective power lines 30, 32 and 34, from apparatus power outputs 36, 38 and 40, respectively. In addition, E.C.'s 20 and 22 are shown to be connected by signal lines 42 and 44, respectively, to apparatus control signal outputs 46 and 48. Apparatus 12 may thus provide operating signals to E.C.'s 20 and 22, which are separately connected, by respective power lines 50 and 52 to power plugs 54 and 56.

Power is provided to apparatus 12 from an existing building electrical outlet 66 through a power cord or line 68. Building outlet 66 may, according to one version of apparatus 12 involved, be selected to provide conventional 110 volts A.C. power, or may, as more particularly described below, be selected to provide 208 volts, 3 phase power.

For purposes of further describing the invention, it will be hereinafter below considered that apparatus 12 provides only power-type outlets 36, 38 and 40. It is, however, to be understood that, as discussed above, the invention is not limited thereto. The same general principals of construction and operation of apparatus 12 are applied whether its outputs are of the power-type or of the signal type, as will be apparent from the following description.

Figure 2:
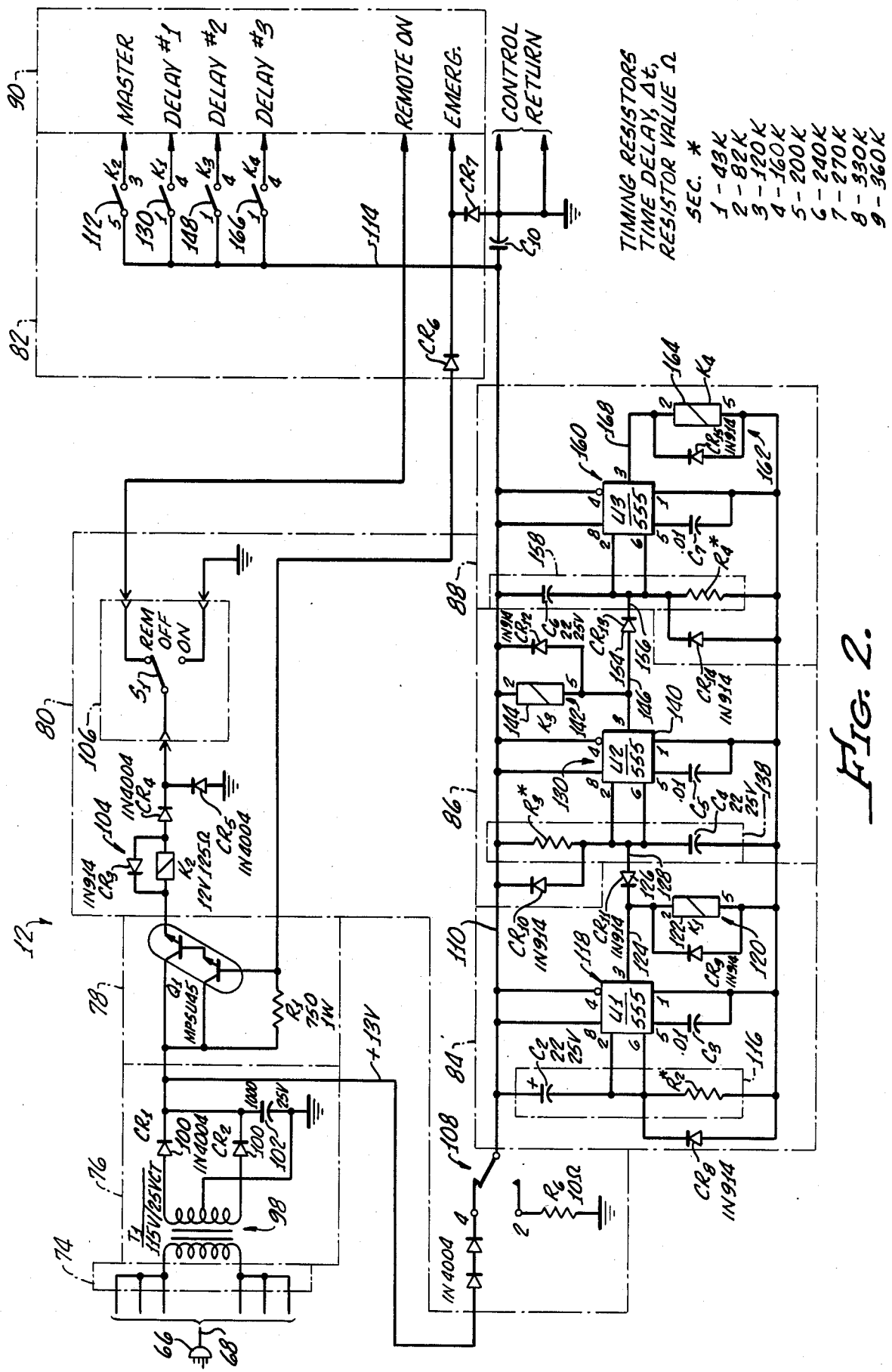
FIG. 2 is an electrical schematic drawing of the time delay power controller apparatus of FIG. 1 showing a plurality of time delay timing stages.

As shown in the circuit schematic drawing of FIG. 2, apparatus 12 comprises generally a power portion or stage 74, which is connected by line 68 to building power outlet 66; a D.C. power supply 76; an emergency shut off stage 78; an actuating or turn-on stage 80; a relay stage 82; first second and third timing delay stages 84, 86 and 88, respectively, and an output stage 90.

Described functionally, power stage 74 provides A.C. power to other portions of apparatus 12, including, in the present embodiment, output stage 90. D.C. power supply 76 provides D.C. voltage, for example, about 12 volts D.C., to timing delay stages 84, 86 and 88 for the operation thereof. Emergency shut-off stage 78 causes an automatic shut off of apparatus 12 in the event an associated emergency line 92 is grounded. Actuating stage 80 is operative for turning on apparatus 12 and for thereby starting the time delay sequencing described below. Timing delay stages 84, 86 and 88 provide a sequence of time delayed signals which, through relay stage 82, control output stage 90.

For illustrative purposes, apparatus 12, as illustrated in FIG. 2 and as more particularly described below, provides a single, non-time delay out-put identified on such Figure as "Master" and first, second and third time delayed outputs, identified as "Delay 1", "Delay 2" and "Delay 3". The "Master" and three "Delays" correspond generally to outputs 36, 38, 40 and 46 of FIG. 1. Although only first, second and third timing delay stages 84, 86 and 88 are shown in FIG. 2, it will be apparent from the following description that additional, in series timing delay stages (not shown) can readily be provided downstream of third stage 88 according to particular commercial or customer needs. It will also become apparent from the following description that the first, second and third timing delay stages 84, 86 and 88 are not identical, but that odd (i.e., first, third, fifth, seventh, ...) stages, only first and third stages 84 and 86 of which are shown are configured the same as one another and that even numbered stages (i.e., second timing, fourth, sixth, eighth, ... stages, only the second stage 86 of which is shown) are configured the same as one another. There are important differences between odd and even numbered stages, as is discussed below.

Described more specifically, D.C. power supply 76 is constructed with a conventional transformer 98, which receives power from power stage 74, two diodes 100 and a capacitor 102. The capacitance of all capacitors shown in FIG. 2 being in microfarads unless otherwise noted on such Figure. Components of power supply 76 are selected to provide about 12 V D.C. voltage, through emergency shutoff stage 78, to a relay coil 104 (also designated as K2 in FIG. 2). Turning on of a switch 106 of actuating stage 80 energizes relay coil 104, thereby causing closing of normally open relay contacts 108 in actuating stage 8u0 and the providing of +12 volts D.C. to a D.C. voltage bus 110 which extends in electrical series through timing delay stages 84, 86 and 88 (as well as any additional timing stages which may be connected downstream of the third in-series stage 88). Accordingly, and as shown in FIG. 2, timing delay stages 84, 86 and 88 are each connected between bus 110 and ground and are, as described below, connected in electrical series.

The described energizing of relay coil 104 also causes closing of relay contacts 112 which thereby causes a D.C. voltage to be applied, through line 114, to the non-time delayed "Master" output. Thus, the turning on of apparatus 12 by switch 106 energizes D.C. bus 110, to start sequential operation of timing stages 84, 86 and 88, as described below, and simultaneously causes a control volage to be applied to the non-time delayed "Master" output.

First timing stage 84 comprises an R-C circuit 116, connected between D.C. voltage bus 110 and ground, a type 555 timer integrated circuit 118 and a normally open control relay 120 having an energizing coil 122, one side of which is connected to ground. Type 555 circuit 118 is connected between R-C 116 and a time delay voltage output line 124 to which is connected the other side of relay coil 122.

Configuration of first stage 84 is such that at time $t_o$ when D.C. voltage from power supply 76 is provided to bus 110 by closing of relay contacts 108, the voltage provided to one side (pins 2 and 6 as shown in FIG. 2) of type 555 circuit 118 non-instantaneous increases from 0 volts to bus voltage, the voltage increase time being equal to the time delay interval $\Delta t_a$, provided by R-C circuit 116. Time delay voltage output line 124 is connected, through a diode 126, to a timer initiating voltage input line 128 of second timer stage 86 in such manner that at time, $t_o$, such output line is at ground potential, relay coil 122 being thereby non-energized. After time interval, $\Delta t_a$, at time $t_1$, when the voltage at pins 2 and 6 of type 555 circuit 118 reaches a preselected voltage, for example, about ⅔ D.C. bus voltage, such circuit causes the voltage state on output line 124 to abruptly change from 0 to bus voltage, thereby energizing relay coil 122 and causing contacts 128 of relay 120 to close. The voltage state on output line 124 thereafter remains the same (at D.C. bus voltage) and relay contacts 128 remain closed until apparatus 12 is turned off. Relay contacts 128 are connected to D.C. bus 110 to thereby apply D.C. bus voltage to "Delay 1" output when such contacts are closed. Thus, at time $t_1$, after initial time delay, $\Delta t_a$, a D.C. voltage "signal" is applied, through relay contacts to, "Delay 1" output, such D.C. signal being maintained until apparatus 12 is turned off by operation of switch 106.

Second timing stage 86 is similar to the above-described first timing stage 84 and comprises an R-C circuit 138, a type 555 140 and a normally-open control relay 142 having an energizing coil 144. A time delay voltage output line 146 is connected to an output (pins 3) of type 555 circuit 140, input pin 2 and 6 of such circuit being connected to R-C circuit 138 and pins 4 and 8 being connected to D.C. Bus 110.

A principal and significant difference between second timing stage 86 and first timing stage 84 is, however, that second stage relay coil 144 is connected between time delay voltage output line 146 and D.C. bus 110, instead of between such output line and ground as is first stage relay coil 122. As is apparent from FIG. 2, voltage output line 146 goes to D.C. Bus voltage when D.C. bus 110 is energized. As a result, relay coil 144 remains unenergized and contacts 148 (in relay stage 82) of relay 142 remain open until second timing stage 86 times out. R-C circuit 116 and type 555 integrated circuit 118 function together as a timing circuit (or means), the R-C circuit providing a ramping voltage which causes or enables the associated type 555 circuit to change the voltage stage on line 124 when the voltage provided by R-C circuit 116 ramps up to a preestablished level.

As described above with respect to first timing stage 84, time delay voltage output line 124 thereof, which is electrically connected through diode 126 to timer initializing voltage input line 128 of second timing stage 86, remains at ground potential until R-C circuit 116 and circuit 118 time out (at time $t_1$) at that time, type 555 circuit 118 flips the voltage state on output line 124 to D.C. bus voltage. Such flipping of voltage states on output line 124 turns off diode 126 and thereby starts the charging of second stage R-C circuit 138 from ground potential towards D.C. bus voltage when, at time, $t_2$, after a timer charging interval of $\Delta t_b$, pins 2 and 6 of type 555 circuit 140, which are connected to R-C circuit 138, reach ⅔ D.C. bus voltage, type 555 circuit 140 causes the voltage state on time delay voltage output line 146 to flip from D.C. bus voltage to ground (FIG. 3). This voltage stage change on line 146 to ground causes coil 144 of relay 142 to be energized, thereby closing relay contacts 148 and providing a control voltage to "Delay 2" output. R-C circuit 138 and type 555 circuit 140 function together as timing means.

Output line 146 of second timing stage 84 is connected through a diode 154 to a timer initiating voltage input line 156 of third timing stage 88. The flipping of second stage out line 146 from D.C. bus voltage to ground potential at time, $t_2$, turns off diode 154, thereby causing an R-C circuit 158 of third time delay timing stage 88 to start discharging from D.C. bus voltage to ground potential.

Third time delay timing stage 88 is preferably a replicate of first timing stage 84, comprising, in addition to R-C circuit 158, a type 555 integrated circuit 160 and a normally open relay 162 having a relay coil 164 and contacts 166 (in relay stage 82). One side of relay coil 164 is connected to a time delayed voltage output line 168 which is, in turn, connected to output pin 3 of type 555 circuit 160. The other side of coil 164 is connected to ground. R-C circuit 158 and type 555 circuit 160 function together as timing means.

Accordingly, one side of the relay coil of every other timing stage (for example relay coils 122 and 164 of first and third stages 84 and 88) is connected to ground. Whereas, the one side of the relay coil of the intermediate timing stages (for example, coil 144 of second stage 86 and a corresponding coil of a fourth, similar stage, not shown, which might be connected in series with third stage 86) is connected directly to D.C. bus 110.

At time, $t_3$, when diode 154 between second timing stage output line 146 and third timing input line 156 is turned off by second stage type 555 circuit 140 flipping the voltage state of output line 146 from D.C. bus voltage to ground, timing circuit 158 starts discharging. A time interval, $\Delta t_c$, later, at time $t_3$, when R-C circuit 158 discharges and pins 2 and 6 of type 555 circuit 160 reach about ground potential, such circuit 160 causes the voltage state at pin 3, and therefore time delay voltage output line 168, to flip from its previous ground potential to D.C. bus voltage.

When output line 168 is at ground potential, relay coil 164 remains unenergized and relay contacts 166 remain open. When at time $t_3$ D.C. bus voltage is applied to output line 168, relay 164 is energized, thereby closing contacts 166 and applying a control voltage to "Delay 3" output.

The above-described configuration of second and third timing stages 86 and 88 provides that the second stage does not enter its timing delay cycle until time $t_1$, when first timing state 84 times out, and that the third stage does not enter its timing delay cycle until the second stage times out at time $T_2$. As a result, outputs "Delay 1", Delay 2", and "Delay 3" are provided voltage signals in a time delayed sequence at times $t_1$, $t_2$ and $t_3$, such time delayed output signals being maintained until apparatus 12 is turned off.

The present inventors have determined that such operation cannot be obtained if all timing delay stages are all constructed identically with relay coils 122, 144 and 164 all being connected either to ground or D.C. bus 110. For example, it has been found that if second and third timing stages 86 and 88 are constructed identically to first timing stage 84, on and off voltage pulses are applied to "Delay 2" and Delay 3" outputs before the desired time delayed control voltages are provided to such outputs. To prevent such occurence by having all relay coils 122, 144 and 164 connected to ground or D.C. bus 110 would require that R-C timing ciruits 138 and 158 be constructed to provide delays equal respectively to ($\Delta t_a + \Delta t_b$) and ($\Delta t_a + \Delta t_b + t_c$).

However, with the above-described configuration, all three timing stages 84, 86 and 88 are made identical except for the connection of relay coils 122, 144 and 164. As a result, all time delays $\Delta t_a$, $\Delta t_b$ and $\Delta t_c$ are, as is generally desirable, equal to one another and no spurious voltage signals are provided to "Delay 1", "Delay 2" and "Delay 3" outputs.

In the event the "Master" and "Delay 1, "Delay 2" and "Delay 3" outputs are of the power output type, D.C. bus voltages provided by the closing of respective relay contacts 112, 130, 148 and 166 are used to actuate normally open power relays 176, 178, 180 and 182, respectively, (FIG. 4), which are connected to receive line power from power stage 74. Accordingly, power relays 176, 178, 180 and 182 are actuated at respective times $t_0$, $t_1$, $t_2$ and $t_3$ to provide power to the "Master", "Delay 1", "Delay 2" and "Delay 3" outputs, also as shown in FIG. 4.

Figure 5:
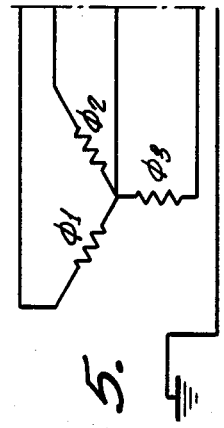
FIG. 5 is a partial schematic drawing showing connection of the apparatus of FIG. 1 to a 208 V, 3 phase power source.

When, for example, as indicated in FIG. 5, three power outputs, for example "Master", "Delay 1" and "Delay 2", and apparatus 12 is connected into a conventional 3-phase power circuit, each power output may be connected, (through relay 176, 178 and 180) to receive power from a different of the power source phases. When the power source is a conventional 208 V, 3∅ source, each power output is thus provided with about 115 V. Powering apparatus 12 in such manner is advantageous in that greater power can be delivered to the apparatus power outputs than would be otherwise possible if each output were connected through apparatus 12 to a conventional 110 V power source.

What is claimed is:

1. Time delay power controller apparatus which comprises:
   (a) a power stage and means for connecting said power stage to a conventional power source;
   (b) a plurality of time delayed outputs;
   (c) a D.C. voltage bus and a ground;
   (d) a D.C. power supply connected to said D.C. bus;
   (e) a plurality of time delay timing stages connected between said D.C. bus and ground,
   each of said timing stages including a timer initiating voltage input line, a time delay voltage output line, a control relay connected to a corresponding one of the time delayed outputs and having an energizing coil connected to said time delay voltage output line and timing means connected between said timer initiating voltage input line and the time delay voltage output line for causing, a predetermined time interval after a change in voltage state appears on said timer initiating voltage input line, a voltage state change on said time delay voltage output line, said voltage state change on said time delay voltage output line causing the energizing of said control relay coil and thereby causing a time delayed control signal to be provided by the control relay to a corresponding one of the time delay outputs;
   (f) means for interconnecting said time delay timing stages in electrical series with one another, the time delay voltage output line of each said timing stage, except the last-in sequence one thereof, being connected to the timer initiating input line of the next-in-sequence one of the timing stages; and
   (g) means for changing the voltage state on the timer initiating voltage input line of the first-in-sequence one of the timing stages to thereby initiate the timing sequence.

2. The time delay power controller apparatus as claimed in claim 1 wherein said time delayed outputs comprise time delayed power outputs for providing electrical power to electrical equipment connected to said power outputs, and including means responsive to the time delayed control signal received from a corresponding one of the timing stage control relays for connecting the power output to said power stage so that electrical power is applied, in a time delayed sequence, to said time delayed power outputs.

3. The time delay power controller as claimed in claim 2 wherein each of said time delayed power outputs include a normally open power relay electrically connected between the power output and the power stage, said relays being closed by the time delayed control signal from a corresponding one of the timing stage control relays so as to connect the power outputs to the power stage.

4. The time delay power controller apparatus as claimed in claim 1 wherein each of said control relays is a normally open relay and wherein one side of the control relay coil of alternate ones of the timing stages are connected to the D.C. bus and one side of the control relay coil of intermediate ones of the timing stages being connected to ground.

5. The time delay power controller apparatus as claimed in claim 1 wherein there are at least two time delayed timing stages.

6. The time delay power controller apparatus as claimed in claim 1 including means for turning on said apparatus and a power output connected for receiving immediate power from said power stage when said apparatus is turned on.

7. The time delay power controller apparatus as claimed in claim 6 wherein said means for changing the voltage state on the timer initiating voltage input line of the first-in-sequence one of the timing stages are operative for changing said voltage state in response to the apparatus being turned on.

8. The time delay power controller as claimed in claim 1 wherein the apparatus includes a first, non-time delay power output and means for applying power from the power stage to said first power output, wherein said time delayed outputs comprise second and third time delay power outputs, each of which include means responsive to the time delay control signal provided thereto by the corresponding one of the timing stage relays for connecting the second and third time delay power outlets to the power stage, said means for changing the voltage state on the timer initiating voltage input line of the first-in-sequence timing stage being responsive to the means for applying power to the first power output for simultaneously providing said voltage state change to the first-in-sequence one of the timing stages.

9. The time delay power controller apparatus as claimed in claim 8 wherein said power stage includes means enabling the connection thereof to a conventional 208 volt, 3 phase power source and for providing power from different ones of said 3 phases to different ones of said first, second and third power outputs.

10. The time delay power controller apparatus as claimed in claim 1 wherein said time delay intervals provided by the timing stages are substantially equal to one another.

11. The time delay power controller apparatus as claimed in claim 10 wherein each of said time delay interval is between about 2 and about 6 seconds.

12. The time delay power controller apparatus as claimed in claim 10 wherein the time delay intervals are about 4 seconds.

* * * * *